United States Patent [19]

Tsai et al.

[11] Patent Number: 5,245,263
[45] Date of Patent: Sep. 14, 1993

[54] ANTI-BACKLASH DRIVE SYSTEMS FOR MULTI-DEGREE FREEDOM DEVICES

[75] Inventors: Lung-Wen Tsai, Potomac; Sun-Lai Chang, Hyattsville, both of Md.

[73] Assignee: University of Maryland, College Park, Md.

[21] Appl. No.: 760,014

[22] Filed: Sep. 13, 1991

[51] Int. Cl.$^5$ .............................................. B25J 9/00
[52] U.S. Cl. .................... 318/568.1; 318/46; 318/568.21; 318/568.11; 901/9; 901/22; 395/80
[58] Field of Search .................. 318/560–513, 318/630, 45–83; 901/3, 5, 9, 12–23, 26, 47; 74/89.17; 395/80–89

[56] References Cited

U.S. PATENT DOCUMENTS

| | | | |
|---|---|---|---|
| 3,512,425 | 5/1970 | Endo | 74/409 |
| 4,507,046 | 3/1985 | Sugimoto et al. | 901/15 |
| 4,645,409 | 2/1987 | Gorman | 901/21 |
| 4,662,814 | 5/1987 | Suzuki et al. | 901/15 |
| 4,702,668 | 10/1987 | Carlisle et al. | 901/21 |
| 4,732,526 | 3/1988 | Nakashima et al. | 901/15 X |
| 4,780,047 | 10/1988 | Holt et al. | 901/15 |
| 4,813,846 | 3/1989 | Helms | 901/23 X |
| 4,828,453 | 5/1989 | Martin et al. | 901/26 X |
| 4,900,997 | 2/1990 | Durand et al. | 318/568.21 |
| 4,972,735 | 11/1990 | Torii et al. | 901/29 |
| 4,976,165 | 12/1990 | Nagahama | 901/26 |
| 4,984,959 | 1/1991 | Kato | 901/26 X |
| 4,998,442 | 3/1991 | Brown et al. | 74/89.17 |
| 5,046,992 | 9/1991 | Tamai et al. | 901/19 |

OTHER PUBLICATIONS

Chang, S. & Tsai, L., "Topological Synthesis of Articulated Gear Mechanisms," *IEEE Transactions on Robotics & Automation*, vol. 6, No. 1 pp. 97–103, Feb. 1990.

*Primary Examiner*—Paul Ip
*Attorney, Agent, or Firm*—Christopher N. Sears

[57] ABSTRACT

A new and innovative concept for the control of backlash in gear-coupled transmission mechanisms. The concept utilizes redundant unidirectional drives to assure positive coupling of gear meshes at all times. Based on this concept, a methodology for the enumeration of admissible redundant-drive backlash-free robotic mechanisms has been established. Some typical two- and three-DOF mechanisms are disclosed. Furthermore, actuator torques have been derived as functions of either joint torques or end-effector dynamic performance requirements. A redundantly driven gear coupled transmission mechanism manipulator has a fail-safe advantage in that, except of the loss of backlash control, it can continue to function when one of its actuators fails. A two-DOF backlash-free arm has been reduced to practice to demonstrate the principle.

11 Claims, 10 Drawing Sheets

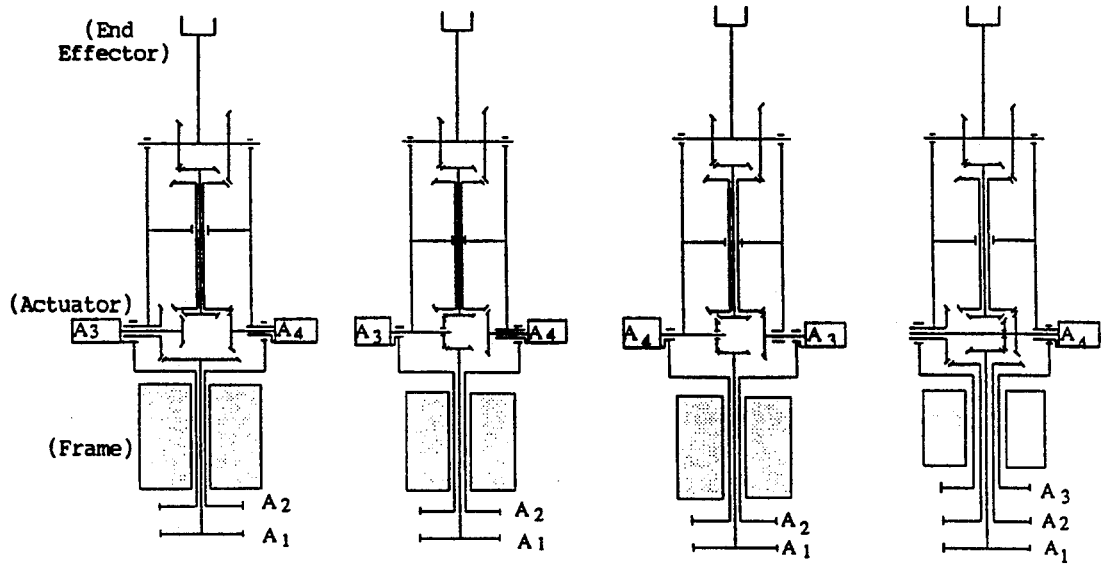
FIG. 6(a) g²se-7
FIG. 6(b) g²se-8
FIG. 6(c) g²s²-7
FIG. 6(d) g³e-5
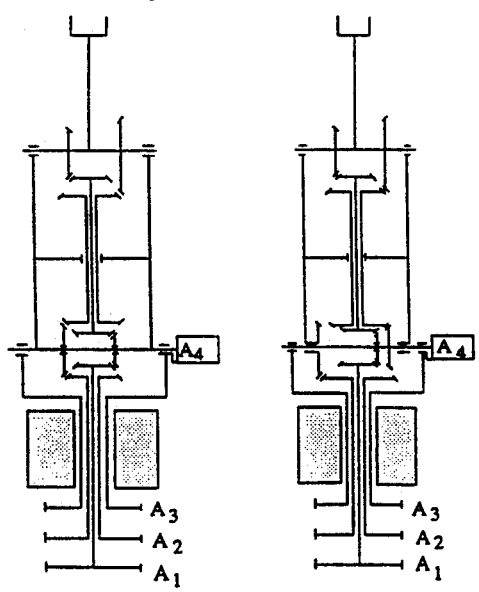
FIG. 6(e) g³s-7
FIG. 6(f) g³s-8
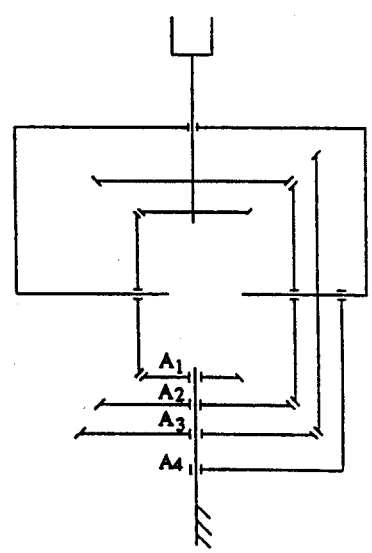
FIG. 6(g) g⁴-5

ANTI-BACKLASH DRIVE SYSTEMS FOR MULTI-DEGREE FREEDOM DEVICES

The United States Government has rights to this invention pursuant to Grant DEFG05-88ER13977 from the U.S. Dept. of Energy.

FIELD OF INVENTION

The present invention relates to an innovative concept for the control of gear backlash in gear transmission mechanisms with multiple degrees of freedom capability. Fundamental rules governing the function of redundant-drive backlash-free gear transmission mechanisms will be presented. Based on these fundamental rules, a number of geared transmission mechanisms will be enumerated, and actuator torque requirement for this class of robotic mechanisms will be disclosed. The invention utilizes (N+1) or more unidirectional drives to eliminate backlash in an N degree of freedom (DOF) system.

BACKGROUND OF THE INVENTION

The position and orientation errors of a manipulator are primarily caused by deviations of geometric and non-geometric parameters from their nominal dimensions. Geometric errors arise from machining and assembling of mechanical parts. Non-geometric errors come from joint angle deviations caused by inaccurate encoder readings, mechanical clearances, compliance, backlash, and link deflection due to loading.

Most industrial robots use gear trains for power transmission to allow actuators to be located in some desirable positions. Gear trains are also used for torque amplification. Backlash is a persistent problem in such machines due to tooth clearances provided for prevention of jamming of gear teeth due to manufacturing errors or thermal expansion. Backlash introduces discontinuity, uncertainty and impact in mechanical systems which, in turn, makes accurate control of a manipulator difficult. End-effector positioning accuracy is also compromised due to backlash. Precision gears, spring-loaded split gear assemblies, and precise mechanical adjustment are often used to overcome these difficulties. However, these techniques do not completely eliminate the backlash and can increase the cost of manufacturing and assembling. Therefore, reducing or eliminating the backlash problem is urgently needed.

Prior anti-backlash techniques using an active actuator technique using unidirectional drives have included U.S. Pat. No. 3,512,425 where two motors drive a load through separate trains of gears. The motors are unidirectionally operated, but drive torque of each motor is always of an opposite sense so as to eliminate backlash. Such a system is limited to a single DOF with no mention of multiple degrees of freedom that would make it useful for robotic operations where multiple degrees of freedom are required.

SUMMARY OF THE INVENTION

The invention is an innovative concept for the control of backlash in gear-coupled robotic systems. The concept utilizes redundant unidirectional drives to assure positive coupling of gear meshes at all times.

Based on the concept, we have disclosed a systematic methodology for the enumeration of a class of unidirectional-drive gear mechanisms. Some typical two- and three-DOF robot manipulators have been sketched for the purpose of demonstration. Actuator sizes have been derived as functions of either joint torques or end-effector dynamic performance requirements.

OBJECTS OF THE INVENTION

The main purpose of the invention is the elimination of gear backlash in a multiple-DOF manipulator.

It is another object of the present invention to provide a redundantly driven gear mechanism with a fail-safe advantage in that, except for the loss of backlash control, it can continue to function when one of its actuators fails to work.

It is still another object of the invention to provide flexibility in usage where, if high accuracy is not important then it is possible to control the actuators in such a way that no antagonism; i.e., anti-torque application, exists among the actuators so as to achieve maximum dynamic performance.

Still another object of the invention is the elimination of gear backlash to reduce noise and vibration associated with gear trains and, at the same time, improve the accuracy and stability of a multi-degree-of-freedom system.

These and other objects of the invention will become more readily apparent in the ensuing specification when taken together with the disclosure and drawings.

BRIEF DESCRIPTION OF DRAWINGS

FIGS. 6a–6g illustrates a few less coupled three-DOF robotic mechanisms in accordance with Table 2.

FIG. 7(a) shows the transformation of the projected region of permissible actuator operation. FIG. 7(b) shows the region of these permissible operations.

DESCRIPTION OF PREFERRED EMBODIMENT

Figure 1:
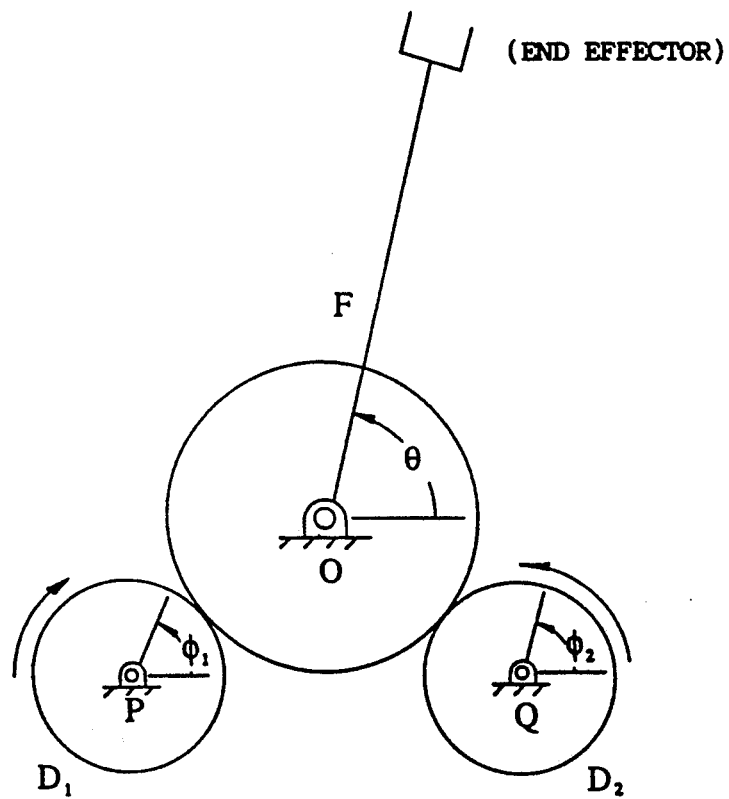
FIG. 1 prior art is a conceptual understanding of a one-DOF system with two unidirectional drives.
Figure 2A:
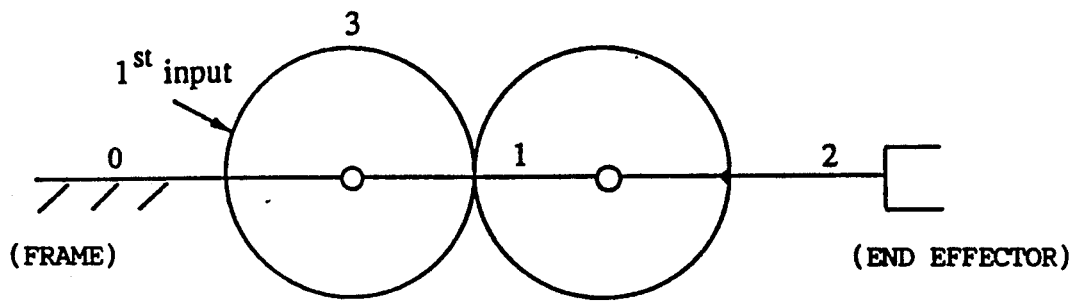
FIGS. 2a–2d illustrate the transmission line design for a two-DOF mechanism.
Figure 2B:
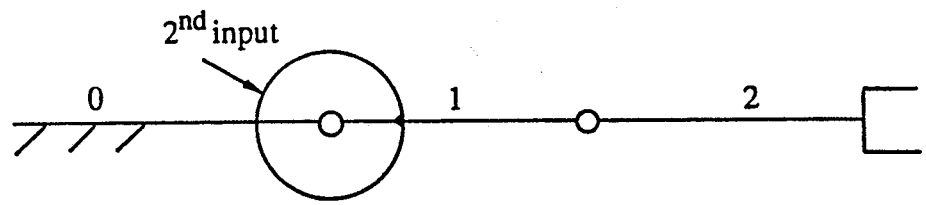
Figure 2C:
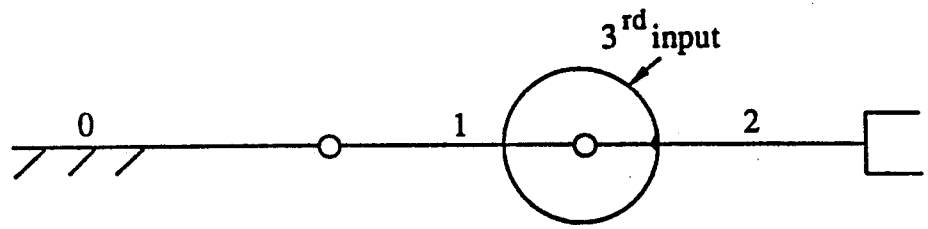
Figure 2D:
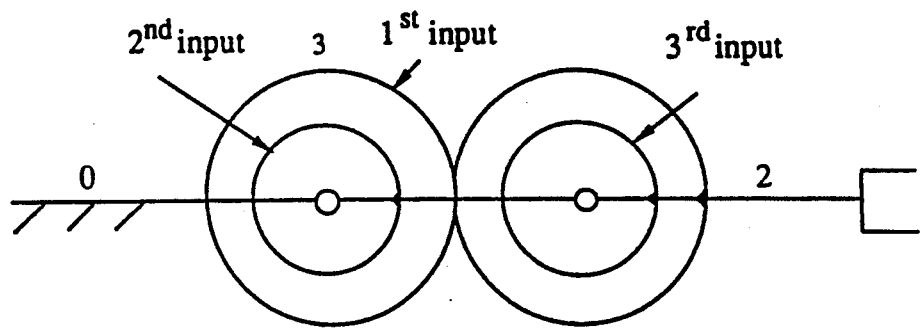

FIG. 1, labeled prior art, shows conceptually a one-DOF gear train with two unidirectional drives, where $D_1$ and $D_2$ are the driving gears and F is the follower. The backlash in this mechanism can be controlled by applying torque to $D_1$ in a clockwise sense and $D_2$ in a counter-clockwise sense at all times. The resultant torque acting on F will be in the counter-clockwise or clockwise sense, depending on whether torque contributed by $D_1$ is greater or less than that contributed by $D_2$. Since no torque reversal is required to drive F, the effects of gear backlash are completely eliminated.

The controllability can be analyzed from kinematic and static points of view. The kinematic equation for the mechanism shown in FIG. 1 can be written as:

$$\begin{bmatrix} \phi_1 \\ \phi_2 \end{bmatrix} = \begin{bmatrix} -(N_f/N_1) \\ -(N_f/N_2) \end{bmatrix} \theta, \qquad (1)$$

where $\phi_1$, $\phi_2$, and $\theta$ denote the angular displacements of gears $D_1$, $D_2$, and F, respectively, and $N_1$, $N_2$, and $N_f$ represent their tooth numbers. Note that the negative sign stands for an external gear mesh. It can be shown that the input and output torques are related by the following equation:

$$\tau_f = [-(N_f/N_1) \ -(N_f/N_2)] \begin{bmatrix} \xi_1 \\ \xi_2 \end{bmatrix}, \qquad (2)$$

where $\xi_1$ and $\xi_2$ are the torques applied to $D_1$ and $D_2$, respectively, and, $\tau_f$ is the output torque of the follower F. For a desired output torque, the applied torques can be expressed as:

$$\begin{bmatrix} \xi_1 \\ \xi_2 \end{bmatrix} = \begin{bmatrix} -\dfrac{N_1 N_2^2}{N_f(N_1^2 + N_2^2)} \\ -\dfrac{N_1^2 N_2}{N_f(N_1^2 + N_2^2)} \end{bmatrix} \tau_f + \lambda \begin{bmatrix} N_1 \\ -N_2 \end{bmatrix}, \qquad (3)$$

where $\lambda$ is an arbitrary real number. The first term on the right-hand side of Eq. (3) is referred to as the particular solution and the second term the homogenous solution. From Eq. (3), it is clear that by selecting a large positive $\lambda$, the sense of input torques $[\xi_1, \xi_2]^T$ can be maintained in the $[+\ -]^T$ direction at all times regardless of the value of $\tau_f$. Similarly, the sense of input torques can also be maintained in the $[-\ +]^T$ direction by selecting a proper negative $\lambda$. We conclude that the mechanism can be controlled by two unidirectional drives which can be designed either in the $[+\ -]^T$ direction or in the $[-\ +]^T$ direction.

The prior art illustrated in the above simple example is limited to one-DOF. For an n-DOF gear-coupled robotic mechanisms, it has been discovered that k-unidirectional drives can be used for this anti-backlash technique, where $2N \geq k \geq (N+1)$. For an n-DOF articulated mechanism, it can be shown that the input angular displacements and joint angles are related by the following linear transformation:

$$\phi = B\,\theta, \qquad (4)$$

where $\theta = [\theta_1, \theta_2, \ldots, \theta_n]^T$ is the joint angular displacement vector, $\phi = [\phi_1, \phi_2, \ldots, \phi_k]^T$ is the input angular displacement vector, and $B = [b_{ij}]$ is a k by n matrix.

Note that the word "joint" refers to the joint in the equivalent open-loop chain of a gear-coupled robotic mechanism. See Tsai, L. W., "The Kinematics of Spatial Robotics Bevel-Gear Train," IEEE J. of Robotics and Automation, Vol. 4, No. 2, pp. 150-156 (1988), for the definition of an equivalent open-loop chain. It can also be shown that the equation relating the resultant joint torques to the input torques is given by:

$$\tau = B^T \xi = A\xi, \qquad (5)$$

where $\tau = [\tau_1, \tau_2, \ldots \tau_n]^T$ denotes the resultant joint torques, and $\xi = [\xi_1, \xi_2, \ldots \xi_k]^T$ denotes the input actuator torques. The matrix, A, known as the structure matrix, is a function of the structural topology and gear ratios. For a given set of joint torques, Eq. (5) constitutes n linear equations in k unknowns. In order to maintain unidirectional torques in the actuators, k should be greater than n. Thus, the solution for actuator torques consists of a particular solution plus a (k−n)-dimensional homogenous solution. The homogenous solution corresponds to certain sets of actuator torques that result in no net joint torques. The homogenous solution can be expressed as a sum of (k−n) basis vectors, each of them being multiplied by an arbitrary constant. Hence, by adjusting the constants, unidirectional actuator torques can be maintained. Furthermore, if k=n+1, then every element in the null vector should be non-zero, and the direction of input torques can be controlled either in the direction of the null vector or in the opposite direction.

Recently a new methodology, based on the concept of transmission lines, has been developed for the enumeration of gear-coupled robotic mechanisms, see Chang, S. L. and Tsai, L. W., 1990, "Topological Synthesis of Articulated Gear Mechanisms", IEEE J. of Robotics and Automation, Vol. 6, No. 1, pp. 97-103. According to the methodology, gear-coupled robotic mechanisms can be created in two steps: (1) enumeration of admissible structure matrices, and (2) construction of mechanisms from the structure matrices. In what follows, if we assume that the number of transmission lines is greater than the number of DOF by one, i.e., k=n+1, then, the structure matrix obeys the following fundamental rules:

R1. The structure matrix is an n×(n+1) matrix and each row must contain at least two non-zero elements.

R2. The sub-matrix obtained by removing any column from a structure matrix is non-singular.

R3. Since actuator torque is transmitted to various joints in a consecutive manner, non-zero elements in a column of the structure matrix must be consecutive.

R4. Switching any two columns of a structure matrix results in a renumbering of the two corresponding input actuators. Hence, two kinematic structures are said to be isomorphic if their corresponding structure matrices become identical after one or repeated operation of column exchanges.

Rules 1 and 2 ensure the unidirectional controllability of a mechanism. Applying the above rules, all the admissible structure matrices suitable for redundant-drive backlash-free robotic mechanisms can be enumerated. Table 1 lists four admissible structure matrices for two-DOF mechanisms, where the "#" sign denotes the existence of a non-zero element in the matrix.

Table 2 lists all the admissible 3-DOF structure matrices. The symbols and designation of links and gears is well known in the transmission arts, see Chang & Tsai (1990) as discussed above. In Table 2, the matrices are arranged according to the distribution of actuators. It is assumed that each transmission line has its actuator located on the joint axis; i.e., link, nearest to the ground;

i.e., chassis. The letters g, s and e denote that the actuators are to be located on the 1st, 2nd, and 3rd joint axes, i.e., consecutive drive links. respectively, and the power stands for the number of actuators to be installed on that joint axis, i.e., link. There are five families listed in Table 2: $g^4$, $g^3s$, $g^3e$, $g^2s^2$, and $g^2se$. For example, the $g^4$ family allows all the actuators to be ground-connected, i.e., connected to the frame. The selection of structure matrix is a compromise between mechanical complexity, inertia load, and the coupling.

TABLE 1
Admissible 2-DOF Structure Matrices $\begin{bmatrix} \# & \# & \# \\ \# & \# & \# \end{bmatrix}$ $\begin{bmatrix} \# & \# & \# \\ \# & \# & 0 \end{bmatrix}$ $\begin{bmatrix} \# & \# & 0 \\ \# & \# & \# \end{bmatrix}$ $\begin{bmatrix} \# & \# & 0 \\ \# & 0 & \# \end{bmatrix}$
$g^3$-1     $g^3$-2     $g^2s$-1     $g^2s$-2

Figure 3:
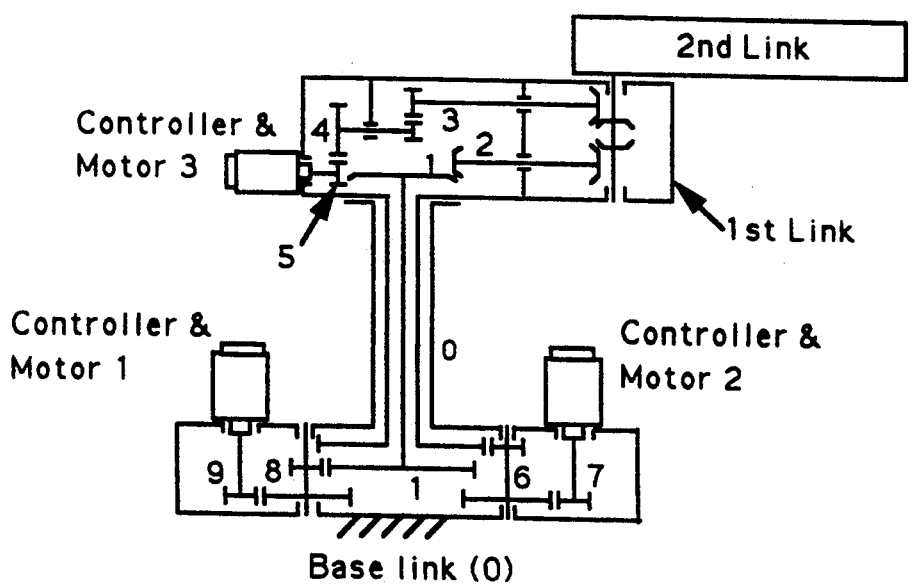
FIG. 3 illustrates the actual construction of a two-DOF manipulator derived from the transmission line design shown in FIG. 2.

The construction of mechanisms from a structure matrix can be accomplished by the method described as the transmission line concept in the article entitled "Topological Synthesis of Articulated Gear Mechanism" by Chang, S. L. and Tsai, L. W.. For example, we can construct a mechanism from structure matrix $g^2s$ - 2 listed in Table 1 as follows. First, a transmission line is constructed for each column of the structure matrix. Then, these transmission lines are combined to form a "basic mechanism" as depicted in FIG. 2. Finally, idler gears can be added to increase the offset distance between two joint axes and/or to achieve greater gear reduction. A "derived mechanism," an actual two-DOF, is shown in FIG. 3, that is shown in FIG. 2. Note that, many mechanisms can be derived from a basic mechanism.

TABLE 2
Admissible 3-DOF Structure Matrices $\begin{bmatrix} \# & \# & \# & \# \\ \# & \# & \# & \# \\ \# & \# & \# & \# \end{bmatrix}$ $\begin{bmatrix} \# & \# & \# & \# \\ \# & \# & \# & \# \\ \# & \# & \# & 0 \end{bmatrix}$ $\begin{bmatrix} \# & \# & \# & \# \\ \# & \# & \# & 0 \\ \# & \# & \# & 0 \end{bmatrix}$ $\begin{bmatrix} \# & \# & \# & \# \\ \# & \# & \# & \# \\ \# & \# & 0 & 0 \end{bmatrix}$
$g^4$-1    $g^4$-2    $g^4$-3    $g^4$-4

$\begin{bmatrix} \# & \# & \# & \# \\ \# & \# & \# & 0 \\ \# & \# & 0 & 0 \end{bmatrix}$
$g^4$-5

$\begin{bmatrix} \# & \# & \# & 0 \\ \# & \# & \# & \# \\ \# & \# & \# & \# \end{bmatrix}$ $\begin{bmatrix} \# & \# & \# & 0 \\ \# & \# & \# & \# \\ \# & \# & \# & 0 \end{bmatrix}$ $\begin{bmatrix} \# & \# & \# & 0 \\ \# & \# & \# & \# \\ \# & \# & 0 & \# \end{bmatrix}$ $\begin{bmatrix} \# & \# & \# & 0 \\ \# & \# & \# & \# \\ \# & \# & 0 & 0 \end{bmatrix}$
$g^3s$-1    $g^3s$-2    $g^3s$-3    $g^3s$-4

$\begin{bmatrix} \# & \# & \# & 0 \\ \# & \# & \# & \# \\ \# & 0 & 0 & \# \end{bmatrix}$ $\begin{bmatrix} \# & \# & \# & 0 \\ \# & \# & 0 & \# \\ \# & \# & 0 & \# \end{bmatrix}$ $\begin{bmatrix} \# & \# & \# & 0 \\ \# & \# & 0 & \# \\ \# & \# & 0 & 0 \end{bmatrix}$ $\begin{bmatrix} \# & \# & \# & 0 \\ \# & \# & 0 & \# \\ \# & 0 & 0 & \# \end{bmatrix}$
$g^3s$-5    $g^3s$-6    $g^3s$-7    $g^3s$-8

$\begin{bmatrix} \# & \# & \# & 0 \\ \# & \# & \# & 0 \\ \# & \# & \# & \# \end{bmatrix}$ $\begin{bmatrix} \# & \# & \# & 0 \\ \# & \# & \# & 0 \\ \# & \# & 0 & \# \end{bmatrix}$ $\begin{bmatrix} \# & \# & \# & 0 \\ \# & \# & 0 & 0 \\ \# & \# & 0 & \# \end{bmatrix}$ $\begin{bmatrix} \# & \# & \# & 0 \\ \# & \# & \# & 0 \\ \# & 0 & 0 & \# \end{bmatrix}$
$g^3e$-1    $g^3e$-2    $g^3e$-3    $g^3e$-4

TABLE 2-continued
Admissible 3-DOF Structure Matrices $\begin{bmatrix} \# & \# & \# & 0 \\ \# & \# & 0 & 0 \\ \# & 0 & 0 & \# \end{bmatrix}$
$g^3e$-5

$\begin{bmatrix} \# & \# & 0 & 0 \\ \# & \# & \# & \# \\ \# & \# & \# & \# \end{bmatrix}$ $\begin{bmatrix} \# & \# & 0 & 0 \\ \# & \# & \# & \# \\ \# & \# & \# & 0 \end{bmatrix}$ $\begin{bmatrix} \# & \# & 0 & 0 \\ \# & \# & \# & \# \\ \# & 0 & \# & \# \end{bmatrix}$ $\begin{bmatrix} \# & \# & 0 & 0 \\ \# & \# & \# & \# \\ \# & 0 & \# & 0 \end{bmatrix}$
$g^2s^2$-1    $g^2s^2$-2    $g^2s^2$-3    $g^2s^2$-4

$\begin{bmatrix} \# & \# & 0 & 0 \\ \# & \# & \# & \# \\ 0 & 0 & \# & \# \end{bmatrix}$ $\begin{bmatrix} \# & \# & 0 & 0 \\ \# & 0 & \# & \# \\ \# & 0 & \# & \# \end{bmatrix}$ $\begin{bmatrix} \# & \# & 0 & 0 \\ \# & 0 & \# & \# \\ \# & 0 & \# & 0 \end{bmatrix}$
$g^2s^2$-5    $g^2s^2$-6    $g^2s^2$-7

$\begin{bmatrix} \# & \# & 0 & 0 \\ \# & \# & \# & 0 \\ \# & \# & \# & \# \end{bmatrix}$ $\begin{bmatrix} \# & \# & 0 & 0 \\ \# & \# & \# & 0 \\ \# & \# & 0 & \# \end{bmatrix}$ $\begin{bmatrix} \# & \# & 0 & 0 \\ \# & \# & \# & 0 \\ \# & 0 & \# & \# \end{bmatrix}$ $\begin{bmatrix} \# & \# & 0 & 0 \\ \# & 0 & \# & 0 \\ \# & 0 & \# & \# \end{bmatrix}$
$g^2se$-1    $g^2se$-2    $g^2se$-3    $g^2se$-4

$\begin{bmatrix} \# & \# & 0 & 0 \\ \# & \# & \# & 0 \\ \# & 0 & 0 & \# \end{bmatrix}$ $\begin{bmatrix} \# & \# & 0 & 0 \\ \# & \# & \# & 0 \\ 0 & 0 & \# & \# \end{bmatrix}$ $\begin{bmatrix} \# & \# & 0 & 0 \\ \# & 0 & \# & 0 \\ 0 & 0 & \# & \# \end{bmatrix}$ $\begin{bmatrix} \# & \# & 0 & 0 \\ \# & 0 & \# & 0 \\ \# & 0 & 0 & \# \end{bmatrix}$
$g^2se$-5    $g^2se$-6    $g^2se$-7    $g^2se$-8

See Chang and Tsai (1990), as given above, for the definitions of basic mechanism and derived mechanism.

Figure 4:
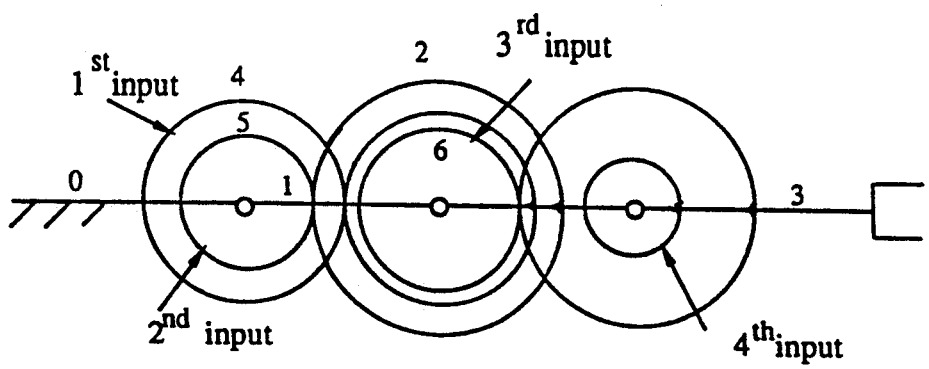
FIG. 4 illustrates the transmission line design of a three-DOF mechanism as shown in FIG. 3.
Figure 5:
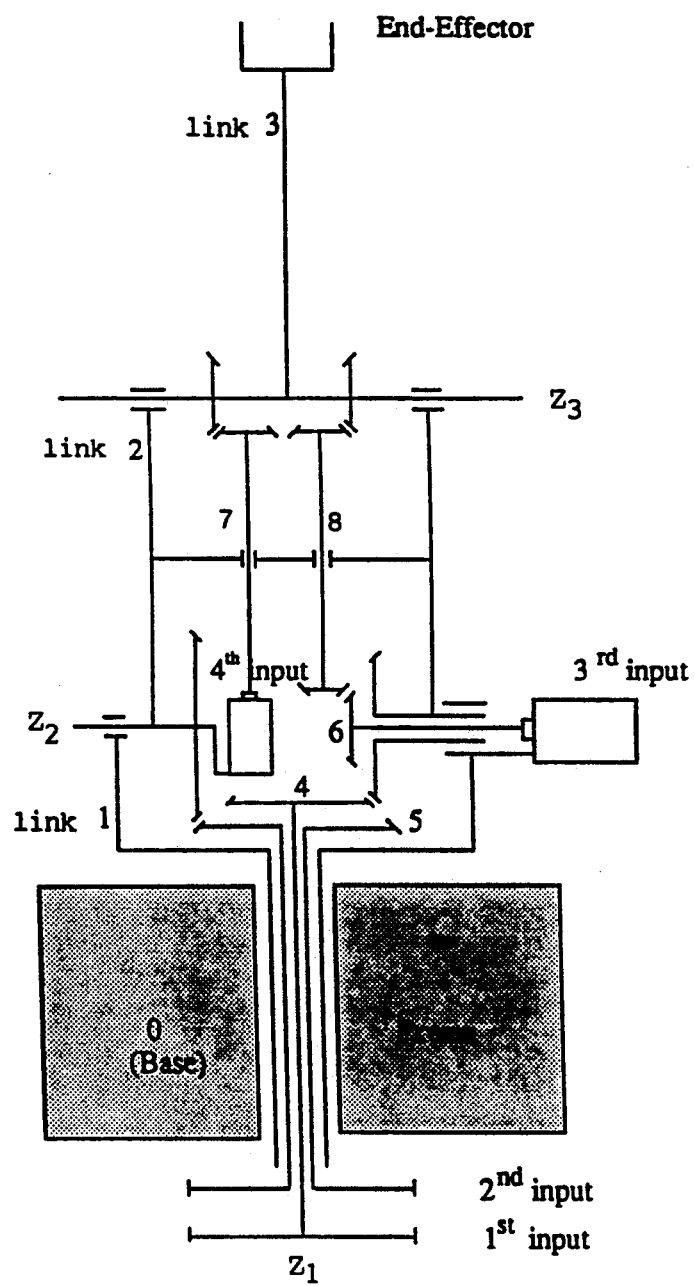
FIG. 5 illustrates the conceptual spatial placement of a three-DOF mechanism derived from the transmission line design shown in FIG. 4.

FIG. 4 shows a 3-DOF basic mechanism constructed from the structure matrix of $g^2*se$-6, as listed in Table 2. FIG. 5 shows a spatial 3-DOF robot arm derived from the basic mechanism shown in FIG. 4. FIG. 6 shows some additional mechanisms constructed from the structure matrices listed in Table 2 where $A_i$ denotes the $i^{th}$ actuator. These mechanisms are judged to be less coupled among each of the five families.

The resultant joint torques as shown in Eq. (5) can be thought of as a set of physical torques acting on the joints of an equivalent open-loop chain. This can be illustrated from the dynamical equations of the system. The Lagrange's equations of motion for a gear-coupled robotic system can be written as:

$$\frac{d}{dt}\left(\frac{\partial L}{\partial \dot{q}_i}\right) - \frac{\partial L}{\partial q_i} = Q_i, \quad i = 1, 2, \ldots, n \quad (6)$$

$$L = T - V, \quad (7)$$

where the q's denote the generalized coordinates, Q's the generalized active forces and where T and V are the kinetic and potential energies of the system, respectively. Using the joint angles as the generalized coordinates, $q_i = \theta_i$, the generalized active forces can be expressed as:

$$Q_i = \sum_{j=1}^{k} \frac{\partial \phi_j}{\partial q_i} \xi_j, \quad i = 1, 2, \ldots, n. \quad (8)$$

Taking partial derivatives of Eq. (4) and substituting them into (8), we obtain $$Q_i = \sum_{j=1}^{k} b_j \xi_j, \quad i = 1, 2, \ldots, n. \qquad (9)$$

Comparing Eqs. (5) and (9), we conclude that the resultant joint torques are the generalized active forces, i.e.

$$Q_i = \tau_i, \quad i = 1, 2, \ldots, n. \qquad (10)$$

The same dynamical equations would be obtained if we assume the mechanism is made up of an open-loop chain having $\tau_i$ acting on joint i. Hence, the dynamic response of the system can be completely characterized by the resultant joint torques.

For a given set of joint torques, actuator torques can be obtained by solving Eq. (5):

$$\xi = A^+ \tau + \lambda \mu \qquad (11)$$

where
$\mu = [\mu_1, \mu_2, \ldots, \mu_n]^T$ is the null vector of A, i.e. A $\mu = 0$,
$A^+ = A^T(A A^T)^{-1}$ is the pseudo inverse of A,
and where $\lambda$ is an arbitrary real number. The first term on the right-hand side of Eq. (11) is called the particular solution and the second term, which results in no net joint torques, is called the homogenous solution. The orthogonality property between these two terms can be shown as follows:

$$(A^+ \tau)^T \lambda \mu = \lambda \tau^T \{(A A^T)^{-1}\}^T A \mu = 0 \qquad (12)$$

Equation (12) implies that the particular solution is a hyperplane passing through the origin and perpendicular to the null vector. To control backlash, actuator torques should be kept in a predetermined direction at all times. This can be achieved by adjusting the arbitrary constant $\lambda$. Equation (11) implies that the direction of actuator torques can be kept either in the direction of the null vector or in the opposite direction.

In the design of a manipulator, sometimes it is desirable to specify the performance in terms of its velocities and accelerations at the end-effector. For this purpose, the joint velocities and joint accelerations in Eq. (6) can be replaced by the end-effector velocities and accelerations. Using the inverse kinematic transformation, the resulting equation can be written in the following form provided by Thomas, M. and Tesar, D., 1982, "Dynamic Modeling of Serial Manipulator Arms", *ASME J. of Mechanisms, Transmissions, and Automation in Design*, Vol. 104, pp. 218-228:

$$\tau_i = G_i^T \alpha + v^T P_i v + f_i, \quad i = 1, 2, \ldots, n, \qquad (13)$$

where v and $\alpha$ are velocity and acceleration vectors of the end-effector, $G_i$ and $P_i$ are $n \times 1$ and $n \times n$ coefficient matrices relating the motion state to joint torques, and $f_i$ is the contribution due to conservative forces. Note that v and $\alpha$ contain both linear and angular components, and $G_i$ and $P_i$ are position dependent.

Hence, joint torques can be calculated from a set of velocity and acceleration specifications. Since the maximum achievable velocity and acceleration are position dependent, the performance of a manipulator can only be specified at certain position(s) of the end-effector. Since, at a given position, the maximum velocity and acceleration are also direction dependent, we may specify the performance of a manipulator in terms of its ability to reach $$v^T W_v v = v_s^2,$$

and $\alpha^T W_\alpha \alpha = a_s^2,$ \qquad (14)

for all directions of motion, where $v_s$ and $a_s$ are the desired magnitudes for the velocity and acceleration, and where $W_\alpha$ and $W_v$ are $n \times n$ symmetric matrices used as weighting functions. If $W_\alpha$ and $W_v$ are chosen to be identity matrices, then Eq. (14) implies that the end-effector can achieve a maximum velocity and acceleration of $v_s$ and $a_s$, respectively at the specified location. Thomas, M., Yuan-Chou, H. C. & Tesar, D., 1985, "Optimal Actuator Sizing for Robotic Manipulators Based on Local Dynamics Criteria," ASME J. of Mechanisms, Transmissions, and Automation in Design, Vol. 107, pp. 163-169, studied the minimum joint torque requirement for optimal actuator sizing based on local dynamic criteria. The study of Thomas, et al. can be applied to individual joint-drive manipulators. However, for gear-coupled mechanisms with unidirectional drives, the theory for actuator sizing is still unexplored. In what follows, the actuator sizing requirement are disclosed.

Figure 7A:
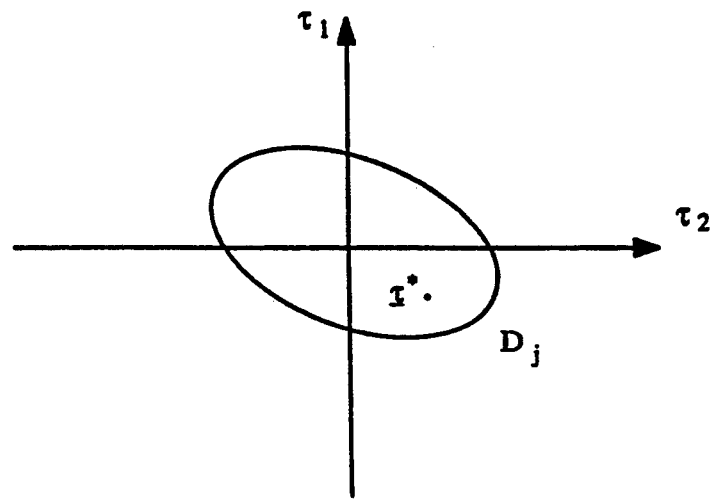
FIGS. 7a–7b illustrates the relationship between joint torques and inputs torques.
Figure 7B:
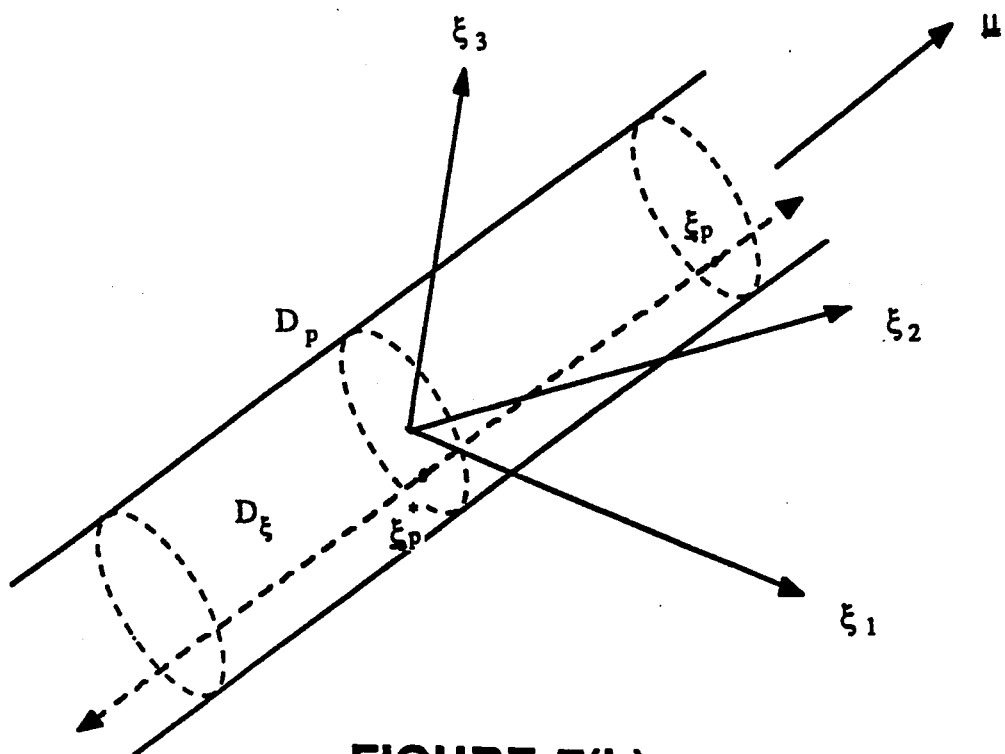

For an example of actuator sizing in terms of joint torques requirement, let $D_j$ be the joint torque working domain, in which a manipulator is intended to operate. This working domain must be transformed into the actuator torque domain, $D_\xi$, in order to size the actuators properly. The transformation from joint torques to input torques can be accomplished in two steps, namely a transformation from the joint torque domain, $D_j$, to a particular solution hyperplane, $D_p$, followed by a transformation from the particular solution domain to the actuator torque domain, $D_\xi$. FIGS. 7(a) and (b) show the transformation between $D_j$, $D_p$, and $D_\xi$ in grapherical form. Note that the transformation from $D_j$ to $D_p$ is unique and $D_\xi$ is obtained by extending $D_p$ along the null vector to plus and minus infinity For a given set of joint torques $\tau^*$ in $D_j$, there is a particular solution $\xi^*_p$ in $D_p$, and the required motor torques can be any point on the line passing through $\xi^*_p$ and parallel to the null vector. To eliminate backlash effects, motor torques must lie in a predetermined quadrant. The actuator sizes can be determined by selecting a proper multiplier, $\lambda$, such that corresponding to every point in the joint torque domain, $D_p$, the required motor torque falls within the predetermined quadrant. Unfortunately, both domains of the working joint torques, $D_j$, and the particular solution hyperplane, $D_p$, cannot be descirbed in concise mathematical forms. This method is, therefore, judged to be impractical for actuator sizing. In what follows, we describe an alternate approach.

A reverse manner is used to size the actuators. This can be illustrated by taking the 2-DOF mechanism shown in FIG. 3 as an example and has been reduced to practice for the verification of this concept. The arm as shown in FIG. 3 is designed to have both joint axes parallel to the direction of gravity to reduce the effect of gravitational force. There are three transmission lines and three actuators (motors). The first two motors are ground-connected, i.e., attached to the frame, and the third is installed on the rear-end of the upper-arm for the purpose of counter-balancing. Motor 1 drives both joints 1 and 2 simultaneously, motor 2 drives joint 1 and motor 3 drives joint 2 individually, with a two-stage gear reduction between the motor and the first joint it drives.

Two measurements are sufficient for the description of the state for this two-DOF RBR arm. Since actuators 2 and 3 drive joints 1 and 2 respectively, sensors are placed on actuators 2 and 3 to avoid the compliance problem associated with the first transmission line. The three actuators can be either dc-motors, stepper motors, brushless dc-motor or other type actuator whose torque is controlled by either a computer, a PD controller or PID controller. Specifically, the controller requires the capability of sensing the position and velocity of the individual joints can process these feedback signals and compensate these signals in relation to the desired joint position and velocity and then can compute and generate the required torque command signals to the actuators. Actual controller configuration is that shown in FIG. 10 for computed torque control of the (N+1) actuators. This particular controller characterizes a typical PID linear servo-loop controller. The structure matrix of the mechanism shown in FIG. 3 is given by:

$$A = \begin{bmatrix} \frac{N_{17}N_{19}}{N_{18}N_{20}} & \frac{N_{13}N_{15}}{N_{14}N_{16}} & 0 \\ \frac{N_{17}N_{19}N_4N_6}{N_{18}N_{20}N_3N_5} & 0 & -\frac{N_7N_9N_{11}}{N_8N_{10}N_{12}} \end{bmatrix} \quad (15)$$

Note that the numerals 3-10 in FIG. 3 actually designate the locator number of gear as follows: Substituting $N_3=64$, $N_4=16$, $N_{14}=N_{16}=N_{18}=N_{20}=15$, $N_5=N_{12}=24$, $N_6=12$, $N_7=N_{10}=20$, $N_8=10$, $N_9=48$, $N_{11}=120$, and $N_{13}=N_{15}=N_{17}=N_{19}=96$, where $N_j$ designates the number of teeth on gear j, into Eq. (15), yields $$A = \begin{bmatrix} 40.96 & 40.96 & 0 \\ 5.12 & 0 & -24 \end{bmatrix}. \quad (16)$$

Figure 8:
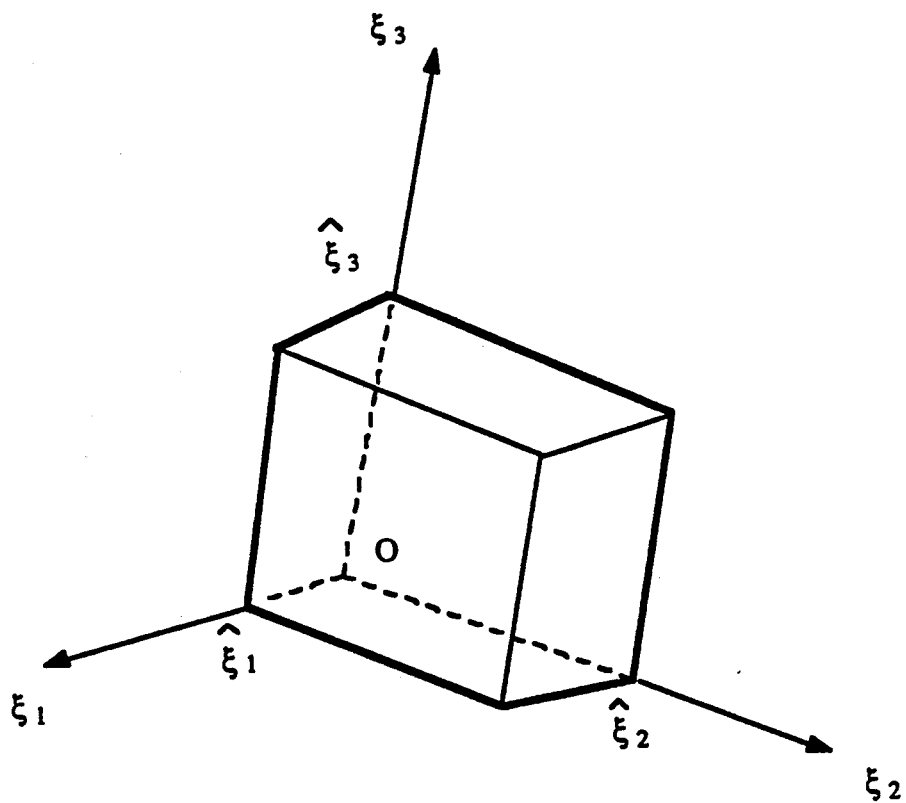
FIG. 8 illustrates the available actuator torque domain projected on the particular solution hyperplane.

The null vector of this structure matrix is $[75, -75, 16]^T$. To simplify the analysis, we redefine the positive direction of the $2^{nd}$ motor axis so that the structure matrix becomes $$A = \begin{bmatrix} 40.96 & -40.96 & 0 \\ 5.12 & 0 & -24 \end{bmatrix}, \quad (17)$$

and the null vector becomes $[75, 75, 16]^T$. Assuming that the actuators chosen for the mechanism have available torque range of $[\pm\xi_1, \pm\xi_2, \pm\xi_3]^T$, then the domain of actuator torques $D_\xi$ will be a rectangular solid in the first quadrant as shown in FIG. 8. Projecting $D_\xi$ along the direction of the null vector results in a domain, $D_p$, in the particular solution hyperplane. The corresponding available joint torque domain, $D_j$, can then be obtained by a transformation using Eq. (5). The domain of available joint torques, $D_j$, should contain the domain of desired joint torques, $D_j$, as a subset. To obtain $D_p$, all 12 edges of the rectangular solid are projected onto the particular solution hyperplane along the direction of the null vector. But, six of them fall inside the boundary of the others. Hence, only six edges constitute the boundary of $D_p$, as shown in FIG. 8. Each of them can be expressed as the intersection of two planes as shown:

$$\begin{cases} \xi_i = \hat{\xi}_i, & i = 1, 2, 3 \\ \xi_j = 0, & j = 1, 2, 3, \; j \neq i. \end{cases} \quad (18)$$

Substituting Eqs. (17) and (18) into (5) for each combination of (i,j), we obtain two equations linear in $\xi_k$, $k \neq i \neq j$. We then eliminate $\xi_k$ from the two equations. This results in one equation which serves as one of the boundary lines for the $D_j$ domain. Repeating the above process for all domain, $D_j$, as shown below:

$$\begin{aligned}
\tau_1 &\geq -40.96 \, \hat{\xi}_2 \\
\tau_1 &\leq 40.96 \, \hat{\xi}_1 \\
\tau_2 &\geq -24 \, \hat{\xi}_3 \\
\tau_2 &\leq 5.12 \, \hat{\xi}_1 \\
\tau_1 - 8\tau_2 &\leq 192 \, \hat{\xi}_3 \\
\tau_1 - 8\tau_2 &\geq -40.96 \, \hat{\xi}_2
\end{aligned} \quad (19)$$

Figure 9:
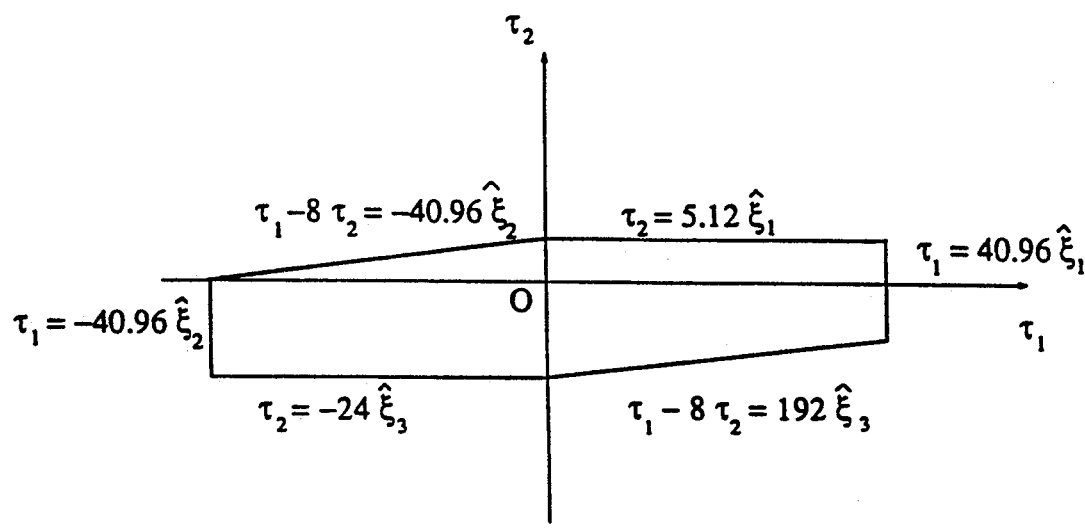
FIG. 9 illustrates the operational joint torque region for the torques of the two-DOF device shown in FIG. 3.
Figure 10:
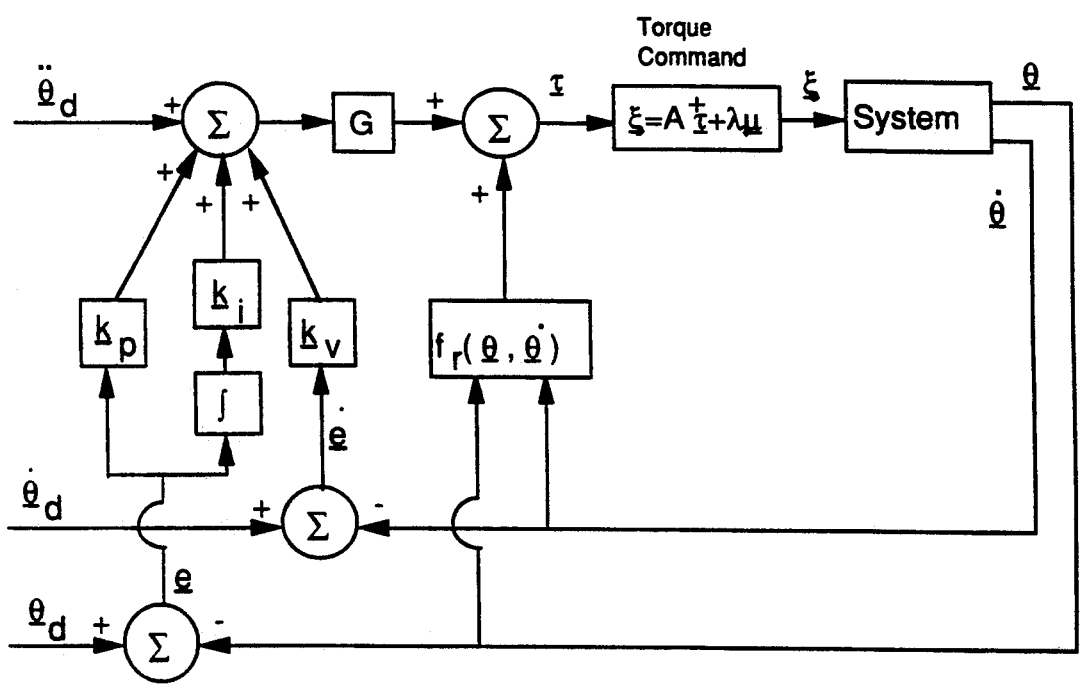
FIG. 10 illustrates the actuator torque controller.

This domain is sketched in FIG. 9 for the purpose of conceptual illustration. Note that we have used a hat (^) to denote the available torques from a set of actuators. A computer, microprocessor or other universal control means can control the torque controlled motors to satisfy these conditions as shown in FIG. 10.

The above methodology can be extended to a general n-DOF robot arm. For the reason of simplicity, we assign the directions of actuator axes in such a way that all elements in the null vector are positive. Thus, the domain of available motor torques, $D_\xi$, can be represented by an (n+1)-dimensional rectangular solid in the first quadrant. There are 2n(n+1) edges in an (n+1)-dimensional rectangular solid. After transformation, only n(n+1) edges form the boundary of $D_p$, and each of them can be represented as the intersection of two planes:

$$\begin{cases} \xi_i = 0, & i = 1, 2, \ldots, n+1 \\ \xi_j = \hat{\xi}_j, & j = 1, 2, \ldots, n+1, \; j \neq i. \end{cases} \quad (20)$$

where $\hat{\xi}_j$ is the maximum available torque from the $j^{th}$ actuator. Substituting Eq. (20) into (5) for each combination of (i,j), we obtain:

$$\tau = A_{ij}\xi_{ij} + \hat{\xi}_j A_j, \quad (21)$$

where $A_{ij}$ is the matrix obtained by deleting the $i^{th}$ and $j^{th}$ columns from matrix A, $\xi_{ij}$ is the column matrix obtained by deleting the $i^{th}$ and $j^{th}$ elements from $\xi$, and $A_j$ denotes the $j^{th}$ column of matrix A.

Equation (21) represents n linear equations in (n−1) unknowns, $\xi_{ij}$, and the compatibility condition for nontrivial solutions to exist is:

$$|\tau - \hat{\xi}_j A_j A_{ij}| = \sum_{l=1}^{n} (-1)^{l-1}(\tau_l - \hat{\xi}_j a_{lj}) |A'_{ij}| = 0, \quad (22)$$

where $|(\ )|$ denotes the determinant of ( ), $a_{lj}$ denotes the (l,j) element of A, and $A'_{ij}$ denotes a sub-matrix of $A_{ij}$ with the $l^{th}$ row omitted. Rearranging Eq. (22) yields the following boundary hyperplanes:

$$\sum_{l=1}^{n}(-1)^{l-1}\tau_l|A_{ij}^l| = \xi_j \sum_{l=1}^{n}(-1)^{l-1}a_{lj}|A_{ij}^l| \quad (23)$$
$$= \xi_j(-1)^s|\hat{A}_i|,$$

where $\hat{A}_i$ denotes a sub-matrix of A with the $i^{th}$ column omitted, and where $$\begin{cases} s = j-1, & \text{if } i > j \\ s = j, & \text{if } i < j. \end{cases} \quad (24)$$

Hence, the actuator torque requirements can be written as:

$$\hat{\xi}_j \geq (-1)^s \frac{\sum_{l=1}^{n}(-1)^{l-1}\tau_l|A_{ij}^l|}{|\hat{A}_i|}, \quad (25)$$

where $i=1,2,\ldots,n+1$; $j=1,2,\ldots,n+1$; and $j \neq i$. There are $n(n+1)$ such equations. Hence, corresponding to a set of joint torques, Eq. (25) yields the minimum torque requirement for each actuator.

The actuator torque requirements can be written as functions of end-effector performance criteria. Substituting Eq. (13) into (25), yields:

$$\hat{\xi}_j \geq (-1)^s \frac{\sum_{l=1}^{n}(-1)^{l-1}|A_{ij}^l|(G_l^T \alpha + v^T P_l v + f_l)}{|\hat{A}_i|} \quad (26)$$

or $$\hat{\xi}_j \geq F_j^T \alpha^T + v^T H_j v + g_j, \quad j=1,2,\ldots,n \quad (27)$$

where $$F_j^T = (-1)^s \frac{\sum_{l=1}^{n}(-1)^{l-1}|A_{ij}^l|G_l^T}{|\hat{A}_i|} \quad (28)$$

$$H_j = (-1)^s \frac{\sum_{l=1}^{n}(-1)^{l-1}|A_{ij}^l|P_l}{|\hat{A}_i|} \quad (29)$$

$$g_j = (-1)^s \frac{\sum_{l=1}^{n}(-1)^{l-1}|A_{ij}^l|f_l}{|\hat{A}_i|} \quad (30)$$

and $i=1,2,\ldots,n+1$, $i \neq j$.

The actuators should be selected to satisfy Eq. (14). Since the maximum value of the three terms in the right-hand side of Eq. (27) can occur simultaneously, actuators should be chosen such that their available torques, $\xi$, are equal to the sum of the maximum value of each term. The maximum value of each term can be obtained as follows:

(a) $1^{st}$ term:

$$\text{Max } \xi_j^\alpha = F_j^T \alpha, \text{ subject to } \alpha^T W_\alpha \alpha = a_s^2 \quad (31)$$

where $\xi_j^\alpha$ denotes the maximum torque required to produce a desired acceleration, $\alpha$. Define J as $$J = F_j^T \alpha + h(\alpha^T W_\alpha \alpha - a_s^2) \quad (32)$$

where h is a Lagrange multiplier. Equating $$\frac{\partial J}{\partial \alpha} \text{ and } \frac{\partial J}{\partial h}$$

to zero, yields, $$F_j + 2h W_\alpha \alpha = 0, \quad (33)$$

and $$\alpha^T W_\alpha \alpha = a_s^2, \quad (34)$$

Solving Eqs. (33) and (34) for h and $\alpha$ and then substituting $\alpha$ into Eq. (31), yields the maximum value of $\alpha_j$ as $$\xi_j^\alpha = a_s(F_j^T W_\alpha^{-1} F_j)^{\frac{1}{2}}. \quad (35)$$

(b) $2^{nd}$ term:

$$\text{Max } \xi_j^v = v^T H_j v, \text{ subject to } v^T W_v v = v_s^2. \quad (36)$$

Define j as $$J = v^T H_j v + h(v^T W_v v - v_s^2), \quad (37)$$

where h is a Lagrange multiplier. By the same method, equating $$\frac{\partial J}{\partial v} \text{ and } \frac{\partial J}{\partial h}$$

to zero, yields:

$$(H_j + H_j^T) v + 2h W_v v = 0, \quad (38)$$

and $$v^T W_v v = v_s^2. \quad (39)$$

From Eq. (38), it can be shown that $h = -\frac{1}{2}$ eigenvalue of $W_v^{-1}(H_j + H_j^T)$, and v=eigenvector of $W_v^{-1}(H_j + H_j^T)$. Premultiplying Eq. (38) by $v^T$ and substituting (39) into the resulting equation, yields $$v^T(H_j + H_j^T) v + 2h v_s^2 = 0. \quad (40)$$

Thus, $\xi_j^v$ has a maximum value of $$\xi_j^v = v^T H_j v = -h v_s^2. \quad (41)$$

(c) $3^{rd}$ term:

The third term is position dependent and can be obtained directly from Eq. (30). Finally, the actuator sizes can be determined by summing Eqs. (35), (41) and (30).

MODE OF OPERATION

FIG. 5 shows the conceptual design of a three-DOF derived from FIG. 4. The base link of the robot arm is designated as link 0, the three moving links as links 1, 2, and 3, and the wrist mechanism is not shown. The axes of rotation for the three moving links are $Z_1$, $Z_2$, and $Z_3$, respectively. The housings, shown as 1st and 2nd inputs, of drives 1 and 2 are connected to the base link, and that of drive 3 to link 1 and drive 4 to link 2. The 1st input drives link 1, directly or via a gear reduction unit (not shown). The 2nd input drives link 5 directly or via a gear reduction unit (not shown), and its torque is also transmitted to link 2 via a bevel gear pair. A kinematic analysis reveals that this mechanism possesses a spatial motion with three degrees of freedom.

The transformation between the angular displacements of the four drives and the joint angles of the arm is given by:

$$\begin{bmatrix} \phi_1 \\ \phi_2 \\ \phi_3 \\ \phi_4 \end{bmatrix} = B \begin{bmatrix} \theta_{10} \\ \theta_{21} \\ \theta_{32} \end{bmatrix} \quad (42)$$

where $$B = \begin{bmatrix} 1 & -N_{2,4} & 0 \\ 1 & N_{2,5} & 0 \\ 0 & 1 & N_{8,6}N_{3,8} \\ 0 & 0 & N_{3,7} \end{bmatrix} \quad (43)$$

and where $\phi_1$, $\phi_2$, $\phi_3$, and $\phi_4$ denote the angular displacements of the rotors of drives 1, 2, 3, and 4 with respect to their respective housings, $\theta_{10}$, $\theta_{21}$, and $\theta_{32}$ denote the angular displacements of link 1 with respect to link 0, link 2 with respect to link 1, and link 3 with respect to link 2, respectively; and $N_{j,k} = N_j/N_k$ denotes the gear ratio of the gears attached to links j and k, respectively, and $N_j$ and $N_k$ denote the number of teeth. We note that given a set of desired joints angles, $\theta_{10}$, $\theta_{21}$, and $\theta_{32}$, the input displacements of the four drives $\phi_1$, $\phi_2$, $\phi_3$, and $\phi_4$, are uniquely determined.

Let $\tau_1$, $\tau_2$, and $\tau_3$ be the resultant torques about joint axes $Z_1$, $Z_2$, and $Z_3$, and let $\xi_1$, $\xi_2$, $\xi_3$, and $\xi_4$ be the torques delivered by drives 1, 2, 3, and 4, respectively. Then it can be shown that the joint torques and input torques are related by the following transformation:

$$\begin{bmatrix} \tau_1 \\ \tau_2 \\ \tau_3 \end{bmatrix} = B^T \begin{bmatrix} \xi_1 \\ \xi_2 \\ \xi_3 \\ \xi_4 \end{bmatrix} \quad (44)$$

there $B^T$ denotes the transpose of the matrix B.

From Eq. (44), we conclude that given a set of input torques, the joint torques are uniquely determined. On the other hand, for a set of desired joint torques, the required input torques are indeterminate. The solution for the required input torques consists of a particular solution plus a homogeneous solution multiplied by an arbitrary constant. The homogeneous solution corresponds to a set of input torques which result in no net joint torques. Hence, by adjusting the constant multiplier of the homogeneous solution, unidirectional torques can be maintained at each drive all the times. Furthermore, if the gear trains are arranged in such a way that all the 3×3 submatrices of matrix A are non-singular, such as the one shown in FIG. 5, then any three motors can be used to drive the arm and the robot will remain operational when any one of the four drives fails to function. The only difficulty under this circumstance is the loss of control in the gear backlash.

Many other configurations are possible. For example, FIG. 6(a)-(g) shows several three-DOF robot arms in which the drives are connected in various configurations as listed by Table 2.

With redundant drives, the control strategy may be totally different from that of a conventional robot. For example, we can choose only three motors to drive the robot to the vicinity of a desired position very quickly, and once the robot is near the desired position, the power of the fourth motor can then be applied to control the backlash and to improve the accuracy. This will reduce power consumption of the motors and frictional losses of the gear trains.

Alternate means of gear transmission include use of timing belts or chain and sprockets. Thus, one could have a transmission means other than coupled gear drives where backlash is eliminated as presented by this disclosure. Further, up to 2N actuators can be implemented to achieve total backlash free control in a gear mechanism for an N-DOF system.

The foregoing description taken together with the appended claims constitutes the disclosure such as to enable a person skilled in the electro-mechanical transmission arts having the benefit of the teachings contained therein to make and use the unit of the invention, and, in general, constitutes a meritorious advance in the art unobvious to such a person not having the benefit of these teachings.

Accordingly, the invention having been described in its best embodiment and mode of operation, that which is desired to be claimed by Letters Patent is:

1. In a multiple degrees of freedom (DOF) transmission system comprising:

plural input drive means to effectuate motion of a load;

a transmission means for coupling torque between the input drive means and the load by torque transmitting members wherein each input drive means provides torque to at least one joint through a transmission line comprising the torque transmission members;

the transmission system having several interconnected links through the joints wherein at least a first moving link is attached to a non-moving frame; and a closed loop controller that controls each of the system's input drive means for a desired operation;

wherein the improvement comprises:

the number of input drive means mounted on the system is one more than the system's number of DOF; with the closed-loop controller further comprises an adaptive anti-backlash torque command means for control of the system's input drive means whereby each of the system's torque transmitting members are always positively engaged when in an operational state provided the following conditions are met:

the torque produced by each of the input drive means operates unidirectionally; with an output of the controller's adaptive anti-backlash torque command means is determined by a summing means of a particular solution vector and a scalar multiple of a homogeneous solution vector wherein:

the particular solution is a vector derived from:

the system's structural matrix embodying a topology of the torque transmitting members, and a resultant joint torque vector derived from the dynamic equations of motion of the system; and the homogeneous solution is a vector of the unidirectional drive torques which results in no net torque at joints within the transmission system.

2. The transmission system of claim 1 wherein the improvement is used in a two DOF system wherein three of the input unidirectional drive means are mounted on the system's frame.

3. The transmission system of claim 1 wherein the improvement is used in a two DOF system wherein one input unidirectional drive means is mounted on the first moving link and two input unidirectional drive means are mounted on the system's frame.

4. The transmission system of claim 1 wherein the improvement is used in a three DOF system wherein four input unidirectional drive means are mounted on the system's frame.

5. The transmission system of claim 1 wherein the improvement is used in a three DOF system wherein three input unidirectional drive means are mounted on the system's frame and one input unidirectional drive means is mounted on the first moving link.

6. The transmission system of claim 1 wherein the improvement is used in a three DOF system wherein three input unidirectional drive means are mounted on the system's frame and one input unidirectional drive is mounted on a second moving link that is attached to the first moving link through a joint.

7. The transmission system of claim 1 wherein the improvement is used in a three DOF system wherein two unidirectional drive means are mounted on the system's frame and two unidirectional drive means are mounted on the first moving link.

8. The transmission system of claim 1 wherein the improvement is used in a three DOF system wherein two unidirectional drive means are mounted on the system's frame, one unidirectional drive means is mounted on the first moving link and one unidirectional drive means is mounted on a second moving link that is attached to the first moving link through a joint.

9. The transmission system of claim 1 wherein the system is a robotic manipulator.

10. The transmission system of claim 1 wherein the improvement further comprises the controller's adaptive anti-backlash torque command means can be disabled whereby the input drive means produce complementary torques that are additive whereby the system's maximum dynamic performance is enabled.

11. In a multiple degrees of freedom (DOF) transmission system comprising:
plural input drive means to effectuate motion of a load;
a transmission means for coupling torque between the input drive means and the load by torque transmitting members wherein each input drive means provides torque to at least one joint through a transmission line comprising the torque transmission members;
the transmission system having several interconnected links through the joints wherein at least a first moving link is attached to a non-moving frame; and
a closed loop controller that controls each of the system's input drive means for a desired operation;
wherein the improvement comprises:
the number of input drive means mounted on the system is at least one more than the system's number of DOF and at least one of the input drive means effectuates motion of more than one joint in the system; with
the closed-loop controller further comprises an adaptive anti-backlash torque command means for control of the system's input drive means whereby each of the system's torque transmitting members are always positively engaged when in an operational state provided the following conditions are met:
the torque produced by each of the input drive means operates unidirectionally; with
an output of the controller's adaptive anti-backlash torque command means is determined by a summing means of a particular solution vector and scalar multiples of several homogeneous solution vectors wherein:
the particular solution is a vector derived from:
the system's structural matrix embodying a topology of the torque transmitting members, and
a resultant joint torque vector derived from the dynamic equations of motion of the system; and
the homogeneous solutions are vectors of the unidirectional drive torques which results in no net torque at joints within the transmission system.

* * * * *